(12) United States Patent
Ghannam et al.

(10) Patent No.: US 11,565,571 B2
(45) Date of Patent: Jan. 31, 2023

(54) SYSTEMS AND METHODS TO PROTECT THE HEALTH OF OCCUPANTS OF A VEHICLE

(71) Applicant: Ford Global Technologies, LLC, Dearborn, MI (US)

(72) Inventors: Mahmoud Yousef Ghannam, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 17/115,151

(22) Filed: Dec. 8, 2020

(65) Prior Publication Data

US 2022/0176779 A1   Jun. 9, 2022

(51) Int. Cl.
*B60H 1/00* (2006.01)
*B60W 10/30* (2006.01)
*B60W 40/08* (2012.01)

(52) U.S. Cl.
CPC ..... *B60H 1/00742* (2013.01); *B60H 1/00871* (2013.01); *B60W 10/30* (2013.01); *B60H 2001/00185* (2013.01); *B60W 2040/0872* (2013.01); *B60W 2040/0881* (2013.01)

(58) Field of Classification Search
CPC ............ B60H 1/00742; B60H 1/00871; B60H 2001/00185; B60H 1/008; B60W 10/30; B60W 2040/0872; B60W 2040/0881
USPC .......................................................... 701/36
See application file for complete search history.

(56) References Cited

U.S. PATENT DOCUMENTS

| | | | |
|---|---|---|---|
| 10,486,590 B2 | 11/2019 | Kirsch et al. | |
| 2007/0262574 A1* | 11/2007 | Breed ................... | G06V 40/103 382/104 |
| 2017/0105104 A1* | 4/2017 | Ulmansky ............... | H04W 4/42 |
| 2018/0059913 A1* | 3/2018 | Penilla ................ | H04L 63/0861 |

(Continued)

OTHER PUBLICATIONS

Siobhan Boyle, Veovo, "Feature: Transit and Social Distancing—Three Ways Operators Can Make It Work", Web Team, Traffic Technology Today, May 14, 2020, 4 pages.

(Continued)

*Primary Examiner* — Jonathan M Dager
*Assistant Examiner* — Jean W Charleston
(74) *Attorney, Agent, or Firm* — Frank Lollo; Eversheds Sutherland (US) LLP (57) ABSTRACT

This disclosure is generally directed to systems and methods for protecting the health of occupants of a vehicle. In an example method, a health monitoring apparatus in a vehicle evaluates an individual and detects a symptom of a contagious disease. The individual may be already seated in a first seat in the vehicle or intends to enter the vehicle. The health monitoring apparatus identifies a second seat that has a pre-defined spatial separation distance from the first seat. The pre-defined spatial separation distance can exceed a threshold spatial separation distance selected to provide health protection against the contagious disease. The health monitoring apparatus issues an advisory to the individual to occupy the second seat. In another example method, the health monitoring apparatus may adjust an airflow pattern in the vehicle so as to provide directional airflows to protect various occupants of the vehicle against an airborne contagious disease.

18 Claims, 5 Drawing Sheets

(56) References Cited

U.S. PATENT DOCUMENTS

| | | | |
|---|---|---|---|
| 2018/0194281 A1* | 7/2018 | Kirsch | B60Q 1/04 |
| 2019/0003877 A1 | 1/2019 | Aina et al. | |
| 2019/0133511 A1* | 5/2019 | Migneco | A61B 5/0077 |
| 2019/0359220 A1* | 11/2019 | Wilson | G05D 1/0055 |
| 2019/0361451 A1* | 11/2019 | Wilson | G08G 1/205 |
| 2020/0209850 A1 | 7/2020 | Abu Elreich | |
| 2021/0315755 A1* | 10/2021 | Matsubayashi | A61G 7/018 |
| 2022/0032956 A1* | 2/2022 | Wolff | G08G 1/205 |
| 2022/0039679 A1* | 2/2022 | Califa | G06T 7/246 |

OTHER PUBLICATIONS

Cate Lawrance et al, "How Can Technology Help With Social Distancing In Train Stations," Intelligent Mobility Xperience, Jun. 23, 2020, 4 pages.

Mahler et al, "Radar Sensors To Determine Position And Physiological Parameters Of A Personln A Vehicle", Microwave Techniques, University of Ulm, Ulm, Germany, D-89069, Mar. 26, 2007, 4 pages.

* cited by examiner

SYSTEMS AND METHODS TO PROTECT THE HEALTH OF OCCUPANTS OF A VEHICLE

BACKGROUND

Various types of contagious diseases are transmitted from person to person in different ways. Some types of contagious diseases are transmitted by direct contact, others by indirect contact (through touched objects), and some others through airborne particles. Medical professionals recommend minimizing risk of transmission by performing actions such as avoiding body contact, washing hands, using sanitizers, wearing masks, and/or avoiding crowds. Airborne illnesses are particularly hard to protect against, especially in terms of avoiding enclosed spaces. People may be advised to minimize the spread of an airborne contagious disease (especially during a pandemic) by avoiding entry into enclosed areas such as restaurants, schools, places of worship, public buildings, private buildings, etc. Though inconvenient to do so, people may abide by the advice and may either avoid entering such buildings or if required to enter a building (an office, for example), may take certain precautions (sanitizing objects, wearing masks, maintaining interpersonal separation distance, avoiding direct contact, etc.).

In some situations, however, such as, for example, when an individual has to make a trip to a medical facility (hospital, clinic, etc.) or travel on business, it may be unavoidable to travel in a vehicle such as a taxi or a rideshare vehicle, for example. It may be desirable when doing so that various types of precautions be taken to protect the individual as well as other occupants of the vehicle. Some of these precautions may be taken by the individual and/or the driver. However, the level of precaution taken may vary from individual to individual and may be inadequate in some cases. It is therefore desirable to provide systems and methods to protect the health of the occupants of the vehicle in an automatic manner.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods related to protecting the health of one or more occupants of a vehicle in view of a contagious disease. In an example method, a health monitoring apparatus in a vehicle may evaluate a first individual and detect a symptom of a contagious disease. In one case, the individual has not yet entered the vehicle. In another case, the individual is seated in a first seat inside the vehicle. The health monitoring apparatus identifies a second seat in the vehicle that has a pre-defined spatial separation distance from the first seat in the vehicle. The pre-defined spatial separation distance can exceed a threshold spatial separation distance that is selected to provide health protection against the contagious disease. The health monitoring apparatus issues an advisory to the individual to occupy the second seat in the vehicle. In another example method, the health monitoring apparatus may adjust an airflow pattern in the vehicle so as to provide directional airflows to protect various occupants of the vehicle against an airborne contagious disease.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, words such as "information" and "data" may be used interchangeably and must be understood to be equivalent in the context of the disclosure. The word "disease" as used herein is intended to encompass all kinds of indicators, symptoms, and occurrences of a communicable malady. As such, it should be understood that the word "disease" encompasses various other words such as, for example, "illness," and "sickness" as well. The word "image" as used herein is intended to encompass a single image (as obtained from a digital camera, for example), multiple images (snapshots obtained from a digital camera, for example), and video images (a video clip, a delayed video stream, real-time streaming video, obtained from a video camera, for example). It should also be understood that the word "example" as used herein is intended to be non-exclusionary and non-limiting in nature.

Figure 1:
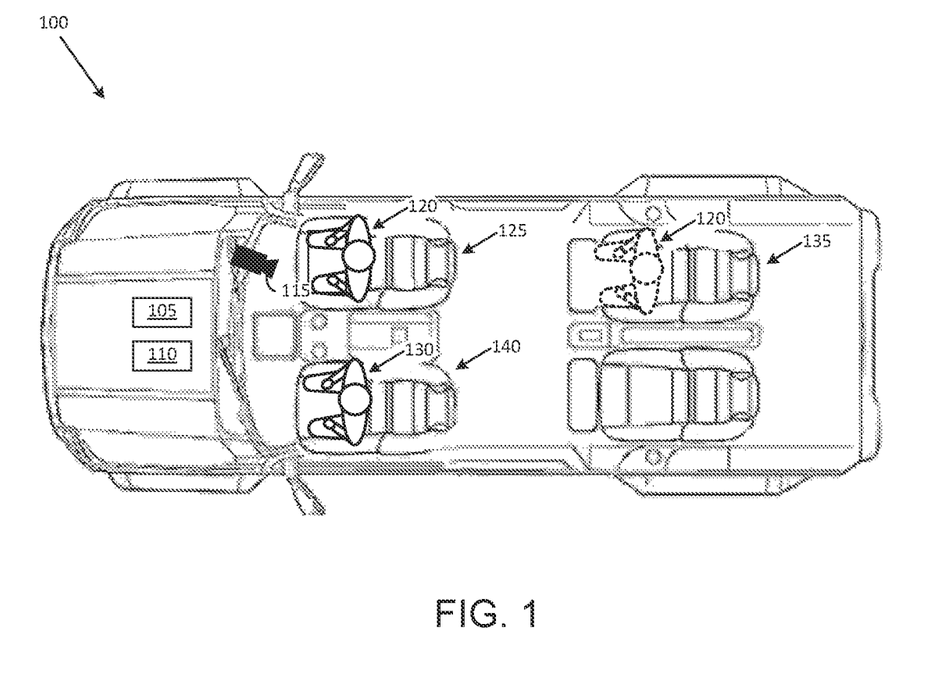
FIG. 1 illustrates a first example scenario where a vehicle protects the health of one or more occupants of the vehicle in accordance with an embodiment of the disclosure.

FIG. 1 illustrates a first example scenario where a vehicle 100 protects the health of one or more occupants of the vehicle 100 in accordance with an embodiment of the disclosure. The vehicle 100 may be any of various types of vehicles such as, for example, a car, a van, a sports utility vehicle, a truck, a bus, an aircraft, or a water craft, an electric vehicle, a gasoline vehicle, a hybrid vehicle, an autonomous vehicle. The vehicle 100 may include components such as a health monitoring apparatus 105, a vehicle systems controller 110, and one or more detection devices such as, for example, an imager 115. These components may be installed at various locations on the vehicle 100, such as, for example, an engine compartment, a glove compartment, a trunk, and/or a console inside the cabin area. The vehicle 100 may further include other components (not shown) such as, for example, an infotainment system and a wireless communication system.

The vehicle systems controller 110 may perform various functions such as, for example, controlling engine operations (fuel injection, speed control, emissions control, braking, parking, accelerating, etc.), managing climate controls (air conditioning, heating etc.), activating airbags, issuing warnings (check engine light, bulb failure, low tire pressure, vehicle in blind spot, etc.), and controlling the door locks of the vehicle 100 (locking/unlocking doors). The vehicle systems controller 110 can include hardware and software that allows the vehicle systems controller 110 to communicate with various devices and systems located inside and/or outside the vehicle 100. Communications between the vehicle systems controller 110 and devices inside the vehicle 100 (such as, for example, the health monitoring apparatus 105) may be carried out via wired and/or wireless communication systems. Wireless communications with external devices may be carried out via a communication network (not shown), which may include any one, or a combination of networks, such as a local area network (LAN), a wide area network (WAN), a telephone network, a cellular network, a cable network, a wireless network, and/or private/public networks such as the Internet. For example, the network may support communication technologies such as Bluetooth®, cellular, near-field communication (NFC), Wi-Fi, Wi-Fi direct, machine-to-machine communication, and/or man-to-machine communication.

The health monitoring apparatus 105 can include hardware and software that allows the health monitoring apparatus 105 to communicate with various devices and systems located inside and/or outside the vehicle 100 (such as, for example, the vehicle systems controller 110, a cloud computing device, and/or a cloud storage device). Such communications may be carried out via wired and/or wireless communication systems through a network in the manner described above.

The detection devices can be provided in various forms such as, for example, in the form of scanners, imagers, and/or sensors that capture and convey to the health monitoring apparatus 105, information pertaining to the health of various individuals who are seated in the vehicle 100 or seeking to enter the vehicle 100.

Some example scanners can include x-ray scanners and thermal scanners. Some example imagers can include a digital camera, a video camera, a thermal imager that captures thermal images, and an infrared camera. Imagers (such as the imager 115) can be operated to capture images that may be conveyed to the health monitoring apparatus 105 for evaluation to detect visible signs of illnesses or diseases. Some examples of visible signs of an illness (or disease) can include rashes, swelling, redness, blisters, scabs, and discolorations (yellow eyes, for example).

Some example sensors can include temperature sensors, weight sensors, blood pressure sensors, heart rate sensors, and audio sensors. An example temperature sensor can be an infrared thermometer that determines a body temperature of an individual based on directing an infrared beam upon an exposed body part of the individual. The health monitoring apparatus 105 may evaluate the body temperature of the individual against a threshold body temperature in order to detect an abnormal body temperature which can be symptomatic of a fever related to an illness or disease.

An example weight sensor located in a seat on which an individual is seated, may be used to obtain a weight measurement of the individual. The health monitoring apparatus 105 may evaluate the measured weight against historic weight measurements of the individual (obtained, for example, from a database of the health monitoring apparatus 105 and/or from cloud-based storage) to determine whether the individual has an abnormal health condition characterized by weight loss.

An example blood pressure sensor may be built into an armrest of a seat in which an individual is seated inside the vehicle 100. The health monitoring apparatus 105 may evaluate blood pressure data obtained from the blood pressure sensor against threshold blood pressure values in order to determine whether the individual has an abnormal health condition characterized by high blood pressure, for example.

An example heart rate sensor may be built into an armrest of a seat in which an individual is seated inside the vehicle 100. The health monitoring apparatus 105 may evaluate heart rate information obtained from the heart rate sensor against threshold heart rate values in order to determine whether the individual has an abnormal health condition characterized by an elevated heart rate, for example.

An example audio sensor may include a microphone mounted on a pillar next to a seat of the vehicle 100. The microphone may convey audio signals present in the cabin area to the health monitoring apparatus 105. The health monitoring apparatus 105 may evaluate the audio signals (using filters and audio processing techniques) to detect audible signs such as a cough, a raspy voice, sneezing, and/or nose blowing, which may indicate an abnormal health condition of an individual in the cabin area. In some cases, the health monitoring apparatus 105 may validate and/or confirm health-related conclusions drawn from evaluating audio sensor signals by comparing such conclusions against conclusions drawn by evaluating images captured by an imager.

The detection devices (scanners, imagers, sensors, etc.) can be mounted at various locations in the vehicle 100 such as in the cabin area and/or on outer sections. The detection devices mounted in the cabin area may be configured to capture information pertaining to a health condition of one or more individuals seated inside the vehicle 100. The detection devices mounted on the outer sections of the vehicle 100 (a door panel, a side view mirror, or a door, for example) may be configured to capture information pertaining to a health condition of an individual seeking to enter the vehicle 100 and/or to detect objects in the vicinity of the vehicle 100. The detected objects can include, for example, another vehicle that is either stationary or moving.

In the example scenario illustrated in FIG. 1, a driver 130 is seated in a driver seat 140 of the vehicle 100. Another individual (a passenger 120) is seated in a front passenger seat 125 of the vehicle 100. The imager 115 may capture an image of the driver 130 and the passenger 120 and propagate the captured image to the health monitoring apparatus 105. The health monitoring apparatus 105 may evaluate the image in order to determine whether the driver 130 and/or the individual 120 has an abnormal health condition. More particularly, in this example scenario, the health monitoring apparatus 105 may evaluate the image in order to determine whether the driver 130 and/or the passenger 120 is displaying a symptom of a contagious disease (such as, for example, elevated temperature, coughing, and/or sneezing).

If the driver 130 and/or the passenger 120 is displaying a symptom of a contagious disease, the health monitoring apparatus 105 may execute one or more protective actions to protect the driver 130 and/or the passenger 120 in accordance with the disclosure. In an example case, the passenger 120 may display a symptom of a contagious disease that is communicable to the driver 130 via touch (if the passenger 120 touches an exposed body part of the driver 130) and/or through the air (if the passenger 120 coughs or sneezes, for example).

Guidelines provided by medical experts in the field of the contagious disease, may include a recommended person-to-person minimum separation distance so as to minimize the risk of disease transmission and spread of the contagious disease. The guideline may be made available to the health monitoring apparatus 105 (from a database in the cloud, for example) and the health monitoring apparatus 105 may set a threshold spatial separation distance based on the guideline. The threshold spatial separation distance, which may be equal to, or different than, the recommended person-to-person minimum separation distance, may be used by the health monitoring apparatus 105 when evaluating a spatial separation distance between the passenger 120 and the driver 130.

In this example scenario, a spatial separation distance between the passenger seat 125 and the driver seat 140 is less than the recommended minimum separation distance. The health monitoring apparatus 105 therefore issues an advisory (audible voice alert, graphical/text alert on a display screen of an infotainment system of the vehicle 100, etc.) to advise the passenger 120 who appears to have the contagious disease to carry out some protective measures to protect the health of the driver 130. An example protective measure may involve donning a face mask. The face mask prevents or minimizes airborne transmission of saliva particles from the passenger 120 to the driver 130. In some example implementations, the health monitoring apparatus 105 may evaluate additional images of the passenger 120 to ensure that the passenger 120 has complied with the advisory. If the passenger 120 has not complied with the advisory, the health monitoring apparatus 105 may execute additional actions such as, for example, re-issuing the advisory to the passenger 120 and/or requesting the driver 130 to enforce the advisory.

Another example protective measure may involve advising the passenger 120 to move from the passenger seat 125 to another passenger seat 135 in the vehicle 100. The spatial separation distance between the passenger seat 135 and the driver seat 140 exceeds the minimum separation distance recommended by medical experts. In some example implementations, the health monitoring apparatus 105 may evaluate additional images of the passenger 120 to ensure that the passenger 120 has complied with the advisory. If the passenger 120 has not moved to the passenger seat 135, the health monitoring apparatus 105 may execute additional actions such as, for example, re-issuing the advisory to the passenger 120, requesting the driver 130 to enforce the advisory, and/or cooperating with the vehicle systems controller 110 to disable one or more operations of the vehicle 100 (moving forward, for example).

Yet another example protective measure, may involve the health monitoring apparatus 105 activating a seat mechanism that moves the passenger seat 125 (backwards, for example), so as to match or exceed the recommended minimum separation distance between the passenger seat 125 and the driver seat 140. Even if the dimensions of the vehicle 100 prevent providing of the recommended minimum separation distance, moving the passenger 120 backwards minimizes the chances of the passenger 120 touching the driver 130 and also minimizes airborne particles (saliva or sputum) emitted by the passenger 120 from landing directly upon the driver 130 if the passenger 120 turns his/her head sideways to sneeze or cough.

In another example protective measure, the health monitoring apparatus 105 may automatically operate a climate control system of the vehicle 100 (air conditioning and/or heating) to adjust an ambient temperature in one or more cabin areas of the vehicle 100 and/or to adjust an airflow pattern in the vehicle 100. The airflow pattern may be adjusted in such a manner as to prevent air that contacts the passenger 120 from traveling towards the driver 130, thereby minimizing the chances of the driver 130 contracting the contagious disease of the passenger 120. In one case, the health monitoring apparatus 105 may partially or fully open one or more windows of the vehicle 100 so as to implement a desired airflow pattern (opening the window closest to the passenger 120, for example), so as to direct airflow towards the passenger 120 and out of the vehicle 100 through the open window.

In an alternative scenario, the health monitoring apparatus 105 may evaluate one or more images captured by the imager 115 and determine that the driver 130 has an abnormal health condition (is suffering from a contagious disease, for example). In this alternative scenario, one or more of the various protective procedures described above with respect to the passenger 120 may be executed in order to protect the health of the passenger 120 (who may be in good health).

Figure 2:
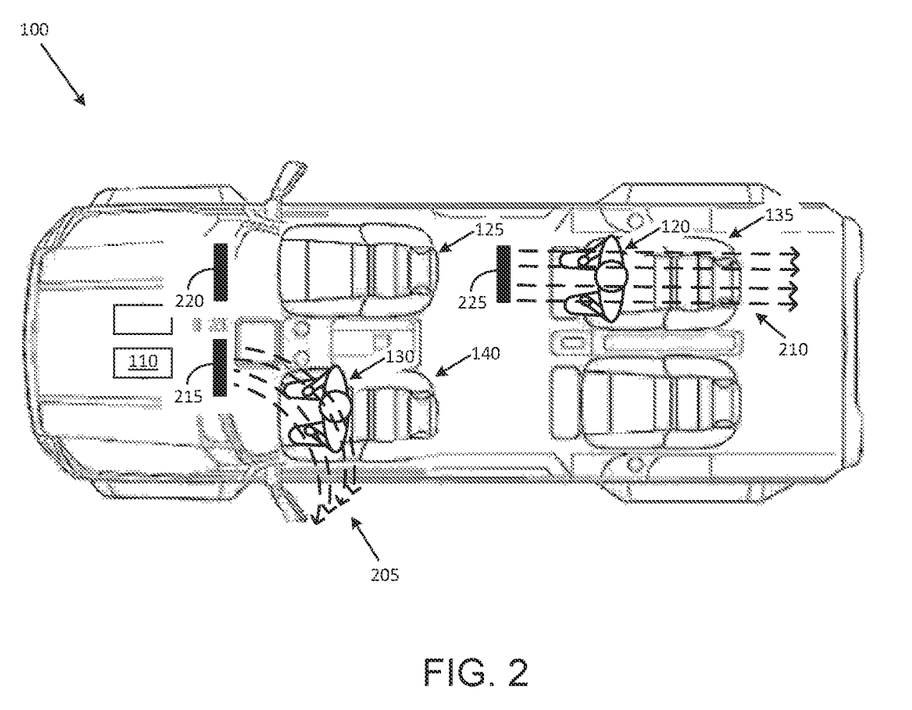
FIG. 2 illustrates a second example scenario where a vehicle protects the health of one or more occupants of the vehicle in accordance with an embodiment of the disclosure.

FIG. 2 illustrates a second example scenario where the vehicle 100 protects the health of one or more occupants of the vehicle 100 in accordance with an embodiment of the disclosure. This scenario pertains to the health monitoring apparatus 105 automatically operating a climate control system of the vehicle 100 (air conditioning and/or heating) to adjust airflow patterns in the vehicle 100. In this example, the health monitoring apparatus 105 executes an airflow pattern 205 by opening a window (fully or partially) next to the driver seat 140 and adjusting the vanes in a vent 215 located in front of the driver 130 so as to direct air (heated or cooled) flowing out of the vent 215 towards the body of the driver 130 and out of the open window next to the driver seat 140.

A second airflow pattern 210 may be set by the health monitoring apparatus 105 with respect to the passenger 120 seated in the passenger seat 135. This operation may be carried out by the health monitoring apparatus 105 closing a vent 220 located in front of the passenger seat 125 and adjusting the vanes in a vent 225 located in front of the passenger 120 so as to direct air (heated or cooled) flowing out of the vent 225 towards the body of the passenger 120 and towards the rear of the vehicle 100 (and out of a rear window that may be opened by the health monitoring apparatus 105, for example).

The two airflow patterns in this example have been configured by the health monitoring apparatus 105 to prevent air that is in contact with the passenger 120 from making contact with the driver 130, thereby minimizing a risk of the driver 130 contracting a contagious decease, and vice-versa.

Figure 3:
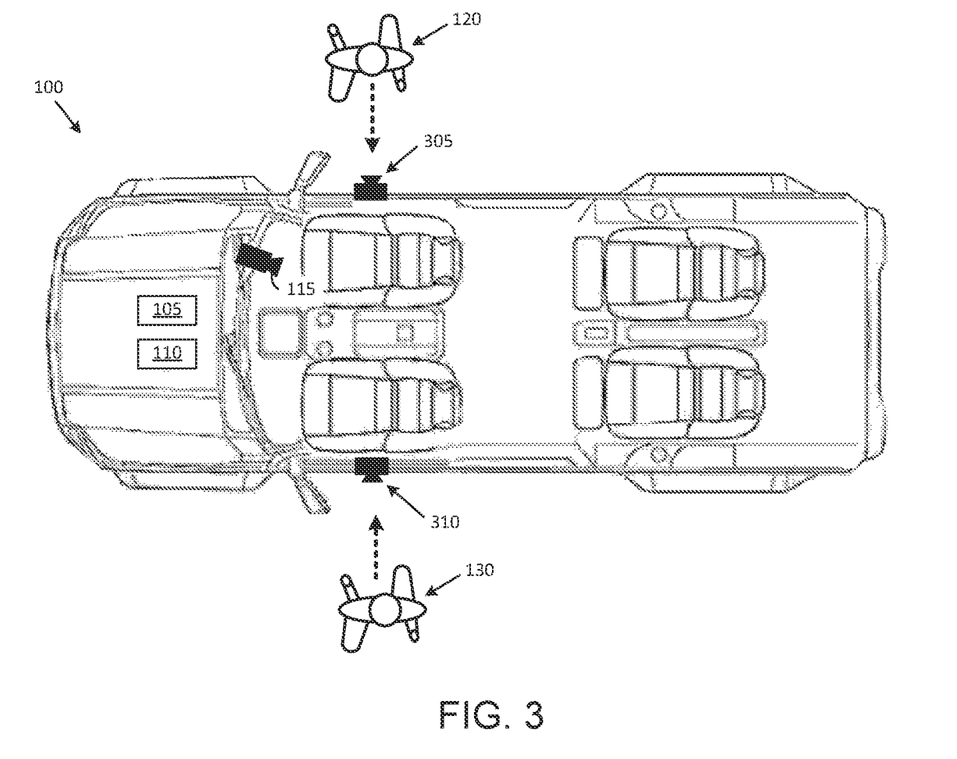
FIG. 3 illustrates a third example scenario where a vehicle protects the health of one or more occupants of the vehicle in accordance with an embodiment of the disclosure.

FIG. 3 illustrates a third example scenario where the vehicle 100 protects the health of one or more occupants of the vehicle 100 in accordance with an embodiment of the disclosure. In this scenario, the driver 130 and/or the passenger 120 are located outside the vehicle 100. A detection device 310, such as, for example, an imager, a thermal scanner, a proximity sensor, and/or an infrared device, may be mounted on an exterior portion of the vehicle 100 (a door panel, side view mirror, etc.). The detection device 310 detects the driver 130 moving towards the vehicle 100 and captures information that may indicate a state of health of the driver 130. The health monitoring apparatus 105 receives the information from the detection device 310 and evaluates the information to assess a health condition of the driver 130. More particularly, the health monitoring apparatus 105 may evaluate the information to determine whether the driver 130 displays a symptom of a contagious disease.

If the driver 130 is displaying a symptom of a contagious disease, the health monitoring apparatus 105 may execute one or more operations to protect the health of one or more occupants of the vehicle 100 in accordance with the disclosure. In an example case, the driver 130 may display a symptom of a type of contagious disease that is extremely contagious. Medical experts may advice a complete isolation and quarantine of any person suffering from this type of contagious disease so as to prevent spreading. In this case, the health monitoring apparatus 105 may issue an announcement (audible voice announcement, graphical/text message on a display screen near a door of the vehicle 100, etc.) to inform the driver 130 of his/her medical condition and may operate the door locks of the vehicle 100 to prevent the driver 130 from entering the vehicle 100.

In another example case, the driver 130 may display a symptom of a contagious disease that is moderately contagious. Medical experts may provide advice on various steps that may be taken to prevent spreading of this moderately contagious disease such as, for example, maintaining a recommended person-to-person spatial separation distance, wearing a face mask, and sanitizing contact areas. The health monitoring apparatus 105 may inform the driver 130 of his/her medical condition and advice the driver 130 to don a face mask in accordance with the medical expert guidance. The health monitoring apparatus 105 may then evaluate information received from the detection device 310 in order to determine of the driver 130 has donned a face mask. If the driver 130 has not donned a face mask, the health monitoring apparatus 105 may lock out the driver 130 from the vehicle 100. If the driver 130 has donned a face mask, the health monitoring apparatus 105 may provide instructions to the driver 130 for taking additional protective measures. The additional protective measures can include, for example, advising the driver 130 to enforce recommended separation distance guidelines upon all occupants of the vehicle 100 and/or to ensure that all the occupants of the vehicle 100 don face masks. In some cases, the health monitoring apparatus 105 may designate one or more seats in the vehicle 100 as unoccupiable seats ("do-not-use" seats) due to various reasons such as, for example, due to a failure to meet a threshold spatial separation distance limitation.

The description provided above with respect to the driver 130 and the detection device 310 can be equally applicable to the passenger 120 and the detection device 305.

Figure 4:
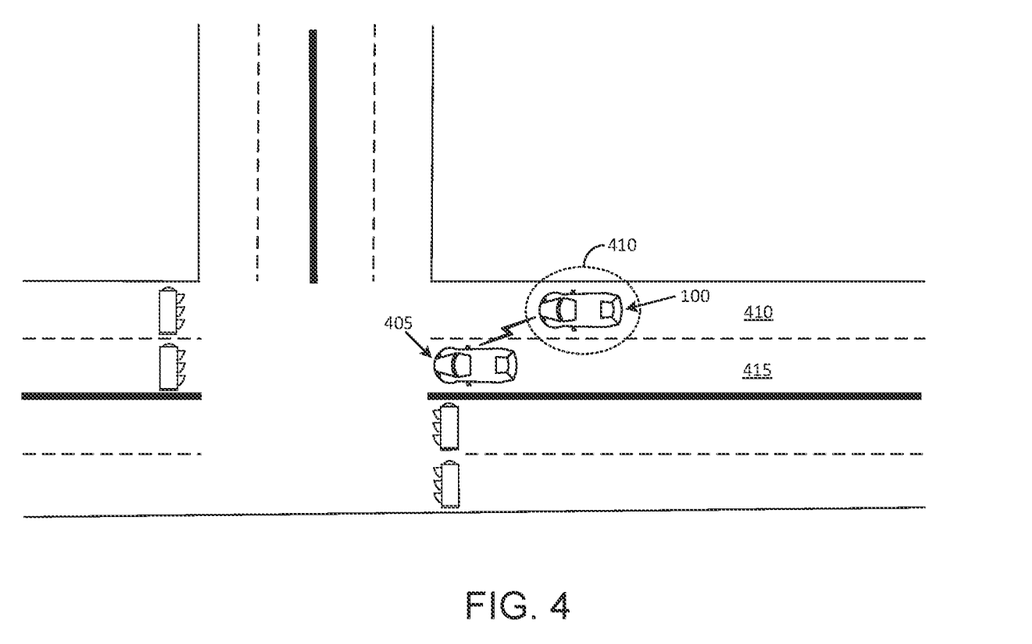
FIG. 4 illustrates a fourth example scenario where a vehicle protects the health of one or more occupants of the vehicle in accordance with an embodiment of the disclosure.

FIG. 4 illustrates a fourth example scenario where the vehicle 100 protects the health of one or more occupants of the vehicle 100 in accordance with an embodiment of the disclosure. In this scenario, the health monitoring apparatus 105 may cooperate with the vehicle systems controller 110 to implement a vehicle-to-vehicle separation distance procedure in accordance with disclosure. The vehicle 100 may be equipped with one or more communication systems such as, for example, a vehicle-to-vehicle (V2V) communication system, a vehicle-to-infrastructure (V2I) communication system, or a vehicle-to-everything (V2X) communication system. In an example embodiment, the vehicle 100 is equipped with a V2V communication system that allows the vehicle 100 to wirelessly communicate with other vehicles such as, for example, a neighboring vehicle 405.

In the example scenario illustrated in FIG. 4, the vehicle 100 detects the other vehicle 405 stopped at an intersection in a lane 415 due to a red traffic signal. The health monitoring apparatus 105 may cooperate with the vehicle systems controller 110 to ensure that the vehicle 100 stops at a location that exceeds a threshold vehicle-to-vehicle separation distance. The threshold vehicle-to-vehicle separation distance may be pre-defined based on various criteria such as, for example, a threshold spatial separation distance that is recommended by medical experts so as to provide health protection against the contagious disease that may afflict one or more occupants of the vehicle 100 and/or one or more occupants of the vehicle 405. In some implementations, the threshold spatial separation distance may be dynamically varied by the health monitoring apparatus 105 based on factors such as, for example, wind conditions, open windows in the vehicle 100, open windows in the vehicle 405, dimensions of the vehicle 100, dimensions of the vehicle 405, road width, and/or lane width.

The location at which the vehicle 100 is stopped at the traffic light may, for example, be behind the vehicle 100 in the same lane 415 or in a different lane (such as, for example, an adjacent lane 410). The stopping action may be performed by the driver 130 under guidance from the health monitoring apparatus 105 (via the infotainment system of the vehicle 100, for example) or may be performed automatically by the vehicle 100 (when the vehicle 100 is an autonomous vehicle, for example).

If traffic conditions prevent the vehicle 100 from being stopped at the illustrated locations and instead compels the vehicle 100 to stop adjacent to the vehicle 405, the health monitoring apparatus 105 may automatically ensure that all windows of the vehicle 100 (or at least the windows closest to the vehicle 405) and/or air vents of the vehicle 100 are closed so as to prevent airflow into the vehicle 100 from outside. The windows and/or vents may be re-opened once the vehicle 100 resumes moving past the intersection and is separated by more than the threshold vehicle-to-vehicle separation distance from the vehicle 405 (and other vehicles).

Protective measures may also be taken when the vehicle 100 is in a moving condition. In an example situation, one or more windows of a vehicle that is moving in an adjacent lane to the lane in which the vehicle 100 is moving, may be open. The vehicle 100 may take pre-emptive action to provide a greater separation distance between the vehicle 100 and the other vehicle by switching lanes so as to provide at least a one-lane separation distance between the vehicle 100 and the other vehicle. The lane changing protective action may be automatically performed by the vehicle 100 when the vehicle 100 is an autonomous vehicle and may be executed by a driver of the vehicle 100 (when the vehicle 100 is driver-operated) in response to an alert provided by the health monitoring apparatus 105. The lane changing protective action may be particularly beneficial when the open windows of a neighboring vehicle are located on a side of the vehicle that is closest to the vehicle 100 (for example, a passenger side of the vehicle that is closest to a driver side of the vehicle 100).

In another example scenario, one or more windows of a large vehicle (such as a bus, for example) that is traveling in an adjacent lane to the vehicle 100 may be open. The large vehicle may be attempting to pass the vehicle 100. The health monitoring apparatus 105 may issue a pre-emptive warning to a driver of the vehicle 100 to alert him/her of the oncoming vehicle and to take protective action such as, for example, to close the windows of the vehicle 100 and/or to move over to another lane so as to provide a greater vehicle-to-vehicle separation distance when the large vehicle passes the vehicle 100.

In yet another example scenario, the health monitoring apparatus 105 may communicate with a health monitoring apparatus in the vehicle 405 (via V2V communications, for example) to inform occupants of the vehicle 405 that one or more occupants of the vehicle 100 is afflicted by a contagious disease. The health monitoring apparatus 105 of the vehicle 100 and the health monitoring apparatus of the vehicle 405 may then cooperate with each other (via communications) so as to provide the recommended vehicle-to-vehicle separation distance at the intersection (as well as when moving). The health monitoring apparatus in the vehicle 405 may also perform various other operations such as alerting the occupants of the vehicle 405 and closing the windows of the vehicle 405 when stopped at the intersection.

In other scenarios, the health monitoring apparatus 105 may detect various other objects near the vehicle 100, such as, for example, a bicyclist or a pedestrian, and may execute actions such as the ones described above, in order to protect the health of occupants of the vehicle 100 and the health of the bicyclist or pedestrian.

Figure 5:
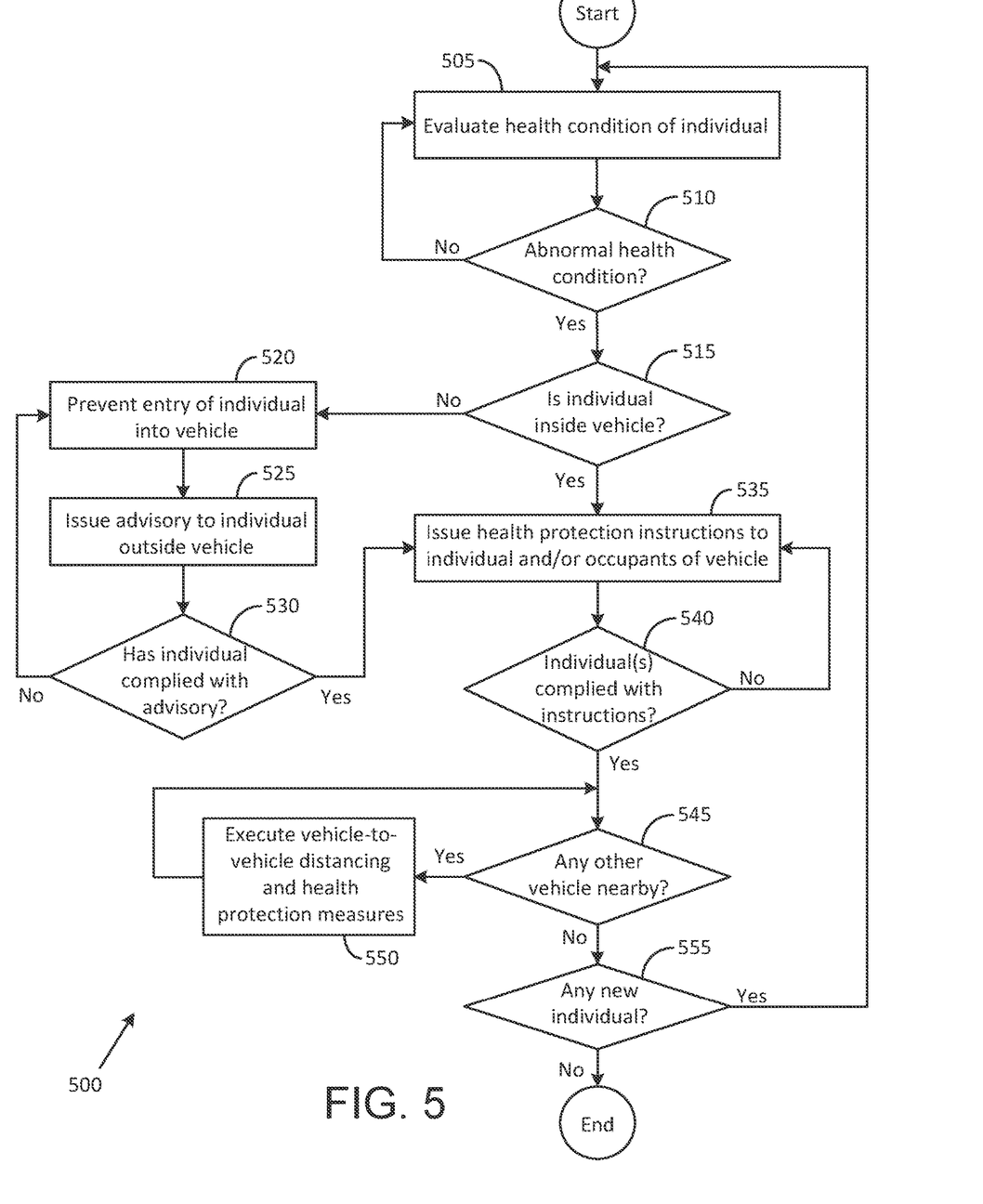
FIG. 5 shows a flowchart of an example method to protect the health of one or more occupants of a vehicle in accordance with an embodiment of the disclosure.

FIG. 5 shows a flowchart 500 of an example method to protect the health of one or more occupants of a vehicle in accordance with an embodiment of the disclosure. The flowchart 500 illustrates an exemplary sequence of operations that can be implemented in hardware, software, or a combination thereof. In the context of software, the operations represent computer-executable instructions stored on one or more non-transitory computer-readable media such as a memory component provided in the health monitoring apparatus 105, that, when executed by one or more processors provided in the health monitoring apparatus 105, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 500 may be executed by the health monitoring apparatus 105, individually and/or in cooperation other apparatuses such as the vehicle systems controller 110 and/or cloud-based computing elements. The operations indicated in the flowchart 500 have been described below by referring to the vehicle 100, individuals, and objects illustrated in FIG. 1 through FIG. 4. However, it must be understood that the flowchart 500 may be executed by various other components in various other scenarios in accordance with the disclosure.

At block 505, a health condition of an individual is evaluated. The evaluation may be carried out by the health monitoring apparatus 105 operating one or more detection devices to obtain information about the driver 130 and/or the passenger 120 of the vehicle 100.

At block 510 a determination is made whether the evaluated individual has an abnormal health condition. More particularly, a determination may be made by the health monitoring apparatus 105 to determine whether the evaluated individual is displaying a symptom of a contagious disease (elevated temperature, coughing, sneezing, etc.). The individual may be either inside or outside the vehicle 100 and the determination may be made in various ways such as by executing the example procedures described above.

If the evaluated individual is not suffering from an abnormal health condition, the health monitoring apparatus 105 may revert to evaluating a health condition of any unevaluated individual in the vehicle 100 (block 505) such as, for example, a health condition of an unevaluated individual who enters the vehicle 100. The operations indicated in block 505 and block 510 may be executed in real time, periodically, or on an as-needed basis (such as, for example, upon detecting a change in occupancy of the vehicle 100, detecting a door of the vehicle 100 being opened, and/or detecting that the vehicle 100 has been stopped.

If the evaluated individual is suffering from an abnormal health condition, at block 515, the health monitoring apparatus 105 may determine whether the individual was located inside the vehicle 100 when the health condition evaluation was performed (block 505 and block 510).

If the individual who has the abnormal health condition is not inside the vehicle 100, but may instead be approaching the vehicle 100 or standing near the vehicle 100, at block 520, the health monitoring apparatus 105 may cooperate with the vehicle systems controller 110 and activate the door locks of the vehicle 100 to prevent the individual from entering the vehicle 100.

At block 525, the health monitoring apparatus 105 may issue an advisory, such as, for example, instructing the individual to don a face mask (or if the individual is the driver 130 to perform additional actions such as described above). The advisory may be provided in any of various forms such as, for example, in the form of an audible voice announcement, a graphical display on a display screen near a door of the vehicle 100, and/or a message transmitted to a smartphone carried by the individual located outside the vehicle 100.

At block 530, the health monitoring apparatus 105 may make a determination whether the individual has complied with the advisory. If the individual has failed to comply with the advisory, the health monitoring apparatus 105 may prevent entry of the individual into the vehicle 100 (block 520).

If the individual has complied with the advisory, at block 535, the health monitoring apparatus 105 may issue health protection instructions to the individual prior to the individual entering the vehicle 100 or after the individual has entered the vehicle 100. Health protection instructions provided prior to the individual entering the vehicle 100 may include, for example, an instruction to don a face mask, an instruction to enter the vehicle 100 and sit in a designated seat of the vehicle 100 (front passenger seat, rear driver-side seat, rear passenger-side seat etc.), and/or an instruction to apply a hand sanitizer before touching a door handle of the vehicle 100.

If the individual who has the abnormal health condition is inside the vehicle 100, at block 535, the health monitoring apparatus 105 may issue health protection instructions (such as, for example, moving from one seat to another, donning face mask, etc.) to the individual and/or other occupants of the vehicle 100.

At block 540, the health monitoring apparatus 105 may make a determination whether the individual has complied with the health protection instructions. If the individual has failed to comply with the health protection instructions, the health monitoring apparatus 105 may re-issue the health protection instructions.

If the individual has complied with the health protection instructions, at block 545, the health monitoring apparatus 105 may execute a vehicle detection procedure to detect the presence of another vehicle near the vehicle 100 such as, for example, the vehicle 405.

If another vehicle is present near the vehicle 100, at block 550, the health monitoring apparatus 105 may execute a vehicle-to-vehicle separation distance procedure as described above.

If no vehicle is present near the vehicle 100, at block 555, the health monitoring apparatus 105 makes a determination to identify the presence of any unevaluated individual in the vehicle 100, such as, for example, an individual who has newly entered into the vehicle 100. If an unevaluated individual is present in the vehicle 100, at block 505, the health condition of the unevaluated individual is evaluated (at block 505) followed by subsequent actions indicated in the flowchart 500.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as a memory device in the health monitoring apparatus 105, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    detecting, by a health monitoring apparatus in a vehicle, a symptom of a contagious disease in a first individual;
    identifying, by the health monitoring apparatus, a first seat in the vehicle that has a first spatial separation distance from a second seat in the vehicle, the first spatial separation distance exceeding a threshold spatial separation distance that is selected to provide health protection against the contagious disease; and
    issuing, by the health monitoring apparatus, an advisory to the first individual to occupy the first seat in the vehicle.

2. The method of claim 1, wherein the first individual is present outside the vehicle, seated in the second seat in the vehicle, or seated in a third seat in the vehicle.

3. The method of claim 1, wherein the second seat is occupied by a driver of the vehicle or a passenger in the vehicle.

4. The method of claim 1, wherein detecting the symptom of the contagious disease comprises:
    determining, by the health monitoring apparatus, that the first individual is outside the vehicle;
    operating a thermal imager to capture a thermal image of the first individual who is outside the vehicle; and
    evaluating, by the health monitoring apparatus, the thermal image to identify the symptom of the contagious disease.

5. The method of claim 1, wherein the contagious disease is an airborne contagious disease, and the method further comprises:
    adjusting, by the health monitoring apparatus, an airflow pattern in the vehicle, the airflow pattern selected to provide health protection against the airborne contagious disease.

6. The method of claim 1, further comprising:
    determining, by the health monitoring apparatus, that the first individual is not seated in the first seat; and
    disabling, by the health monitoring apparatus, a component of the vehicle to prevent a movement of the vehicle while the first individual is not seated in the first seat.

7. A method comprising:
    detecting, by a health monitoring apparatus in a vehicle, an abnormal health condition of a first individual seated in the vehicle;
    conveying, by the health monitoring apparatus, to a vehicle systems controller, an advisory to execute a protective action to protect a health of a second individual; and
    executing, by the vehicle systems controller, the protective action to protect the health of the second individual,
    wherein the second individual is seated in the vehicle, wherein detecting the abnormal health condition comprises detecting a symptom of a contagious disease, and wherein executing the protective action comprises moving a first seat in the vehicle to provide a first spatial separation distance between the first seat and a second seat, the first spatial separation distance exceeding a threshold spatial separation distance that is selected to provide health protection against the contagious disease.

8. The method of claim 7, wherein detecting the symptom of the contagious disease comprises the health monitoring apparatus measuring a body temperature of the first individual.

9. The method of claim 7, wherein the second individual is outside the vehicle, and wherein executing the protective action comprises the vehicle systems controller issuing an alert to the second individual and/or operating a door lock of the vehicle to prevent the second individual from entering the vehicle.

10. The method of claim 7, wherein the second individual is seated in the vehicle, wherein detecting the abnormal health condition comprises detecting an abnormal body temperature of the first individual, and wherein executing the protective action comprises the vehicle systems controller automatically adjusting a climate control system of the vehicle.

11. The method of claim 10, wherein automatically adjusting the climate control system of the vehicle comprises adjusting an airflow inside the vehicle and/or modifying an ambient temperature inside the vehicle.

12. The method of claim 11, wherein automatically adjusting the airflow inside the vehicle comprises directing airflow away from the first individual and/or the second individual.

13. The method of claim 7, wherein the vehicle is an autonomous vehicle, wherein the second individual is seated in the autonomous vehicle, wherein detecting the abnormal health condition comprises detecting a symptom of a contagious disease, and wherein executing the protective action comprises controlling a movement of the autonomous vehicle to provide a first spatial separation distance between the autonomous vehicle and a neighboring vehicle.

14. A vehicle comprising:
a health monitoring apparatus configured to detect an abnormal health condition of a first individual seated in the vehicle; and
a vehicle systems controller configured to respond to an advisory received from the health monitoring apparatus by executing a protective action to protect a health of a second individual,
wherein the second individual is seated in the vehicle, wherein the health monitoring apparatus detects the abnormal health condition by detecting a symptom of a contagious disease, and wherein the vehicle systems controller executes the protective action by moving a first seat in the vehicle to provide a first spatial separation distance between the first seat and a second seat, the first spatial separation distance exceeding a threshold spatial separation distance that provides health protection against the contagious disease.

15. The vehicle of claim 14, wherein the health monitoring apparatus comprises a thermal imager that measures a body temperature of the first individual, and wherein an abnormal body temperature is the symptom of the contagious disease.

16. The vehicle of claim 15, wherein the second individual is seated in the vehicle, and wherein the vehicle systems controller executes the protective action by adjusting a climate control system of the vehicle.

17. The vehicle of claim 16, wherein adjusting the climate control system of the vehicle comprises adjusting an airflow inside the vehicle and/or modifying an ambient temperature inside the vehicle.

18. The vehicle of claim 14, wherein the second individual is outside the vehicle, and wherein the vehicle systems controller executes the protective action by issuing an alert to the second individual and/or operating a door lock of the vehicle to prevent the second individual from entering the vehicle.

* * * * *